United States Patent
Maloney (10) Patent No.: US 6,427,913 B1
(45) Date of Patent: Aug. 6, 2002

(54) OBJECT CONTROL AND TRACKING SYSTEM WITH ZONAL TRANSITION DETECTION

(75) Inventor: William C. Maloney, Marietta, GA (US)

(73) Assignee: Key-Trak, Inc., Duluth, GA (US)

(*) Notice: Subject to any disclaimer, the term of this patent is extended or adjusted under 35 U.S.C. 154(b) by 0 days.

(21) Appl. No.: 09/392,267

(22) Filed: Sep. 9, 1999

Related U.S. Application Data (60) Provisional application No. 60/099,954, filed on Sep. 11, 1998.

(51) Int. Cl.[7] .................................................. G06K 15/00
(52) U.S. Cl. ........................................ 235/383; 235/385
(58) Field of Search .................................. 235/383, 385, 235/462.13, 384, 462.46, 472.02; 340/10.33, 10.42, 10.5, 10.1

(56) References Cited

U.S. PATENT DOCUMENTS

| | | | |
|---|---|---|---|
| 29,236 A | 8/1860 | Walter | |
| 527,589 A | 10/1894 | Bristol | |
| 2,859,789 A | 11/1958 | Buckett | 150/49 |
| 2,971,806 A | 2/1961 | Andreasen | 312/223 |
| 3,451,043 A | 6/1969 | Krause | 340/152 |
| 3,648,241 A | 3/1972 | Naito et al. | 340/147 R |
| 3,836,755 A | * 9/1974 | Ehrat | 235/383 |
| 4,060,795 A | 11/1977 | Harumiya et al. | 364/900 |
| 4,112,717 A | 9/1978 | Bradley | 70/63 |
| 4,209,787 A | 6/1980 | Freeny, Jr. | 343/112 R |
| 4,267,942 A | 5/1981 | Wick, Jr. et al. | 221/2 |
| 4,275,385 A | 6/1981 | White | 340/312 |
| 4,419,734 A | 12/1983 | Wolfson et al. | 364/567 |
| 4,519,522 A | 5/1985 | McElwee | 221/13 |
| 4,549,170 A | 10/1985 | Serres et al. | 340/568 |
| 4,575,719 A | 3/1986 | Bertagana et al. | 340/825.35 |
| 4,595,922 A | 6/1986 | Cobb et al. | 340/825.49 |
| 4,635,053 A | 1/1987 | Banks et al. | 340/825.31 |
| 4,636,634 A | 1/1987 | Harper et al. | 350/223 R |
| 4,636,950 A | 1/1987 | Caswell et al. | 364/403 |
| 4,658,357 A | 4/1987 | Carroll et al. | 364/406 |
| 4,661,806 A | 4/1987 | Peters et al. | 340/568 |
| 4,673,915 A | 6/1987 | Cobb | 340/568.1 |
| 4,737,910 A | 4/1988 | Kimbrow | 364/403 |
| 4,796,209 A | 1/1989 | Burk | 364/559 |

(List continued on next page.)

FOREIGN PATENT DOCUMENTS

| | | | |
|---|---|---|---|
| WO | WO9504324 | 2/1993 | |
| WO | WO9512858 | 5/1995 | |
| WO | WO 96/31790 | 10/1996 | G01V/15/00 |
| WO | WO 97/04338 | 2/1997 | G01V/15/00 |
| WO | WO 97/48990 | 12/1997 | G01V/3/08 |
| WO | WO 98/15851 | 4/1998 | G01V/3/10 |
| WO | WO 98/15853 | 4/1998 | G01V/15/00 |
| WO | WO 98/26312 | 6/1998 | G01V/15/00 |
| WO | WO 99/09436 | 2/1999 | G01V/15/00 |
| WO | WO 99/23741 | 5/1999 | G01V/15/00 |
| WO | WO 99/35516 | 7/1999 | G01V/15/00 |

Primary Examiner—Michael G. Lee
Assistant Examiner—Daniel St. Cyr
(74) Attorney, Agent, or Firm—Womble Carlyle Sandridge & Rice, PLLC (57) ABSTRACT

An improved object tracking and control system is particularly suited to implementation at an automobile dealership. The system includes a Key Track system adapted to control access to and log the check out and check in of keys to vehicles on the lot. RFID tags are provided on the vehicles and tag readers are embedded at selected locations within the dealership parking lot to detect movement of vehicles. In one embodiment, the lot is subdivided into zones and the readers are located at transition regions between the zones. Information about the check out and check in of keys from the Key Track system is combined and integrated with information about the movement of vehicles about the lot to reach conclusions regarding authorized movement and to provide useful information to dealership management.

8 Claims, 3 Drawing Sheets

U.S. PATENT DOCUMENTS

| | | | | |
|---|---|---|---|---|
| 4,799,587 | A | 1/1989 | Desanto | 206/37.6 |
| 4,812,985 | A | 3/1989 | Hambrick et al. | 364/478 |
| 4,814,592 | A | 3/1989 | Bradt et al. | 235/381 |
| 4,827,395 | A | 5/1989 | Anders et al. | 364/138 |
| 4,839,875 | A | 6/1989 | Kuriyama et al. | 369/14 |
| 4,845,492 | A | 7/1989 | Cobb et al. | 340/825.49 |
| 4,853,692 | A | 8/1989 | Wolk et al. | 340/573 |
| 4,866,661 | A | 9/1989 | dePrins | 364/900 |
| 4,882,569 | A | 11/1989 | Dey | 340/572 |
| 4,889,977 | A | 12/1989 | Haydon | 235/385 |
| 4,926,161 | A | 5/1990 | Cupp | 340/572 |
| 4,929,819 | A * | 5/1990 | Collins, Jr. | 235/383 |
| D308,777 | S | 6/1990 | Gambello | D6/467 |
| 4,940,966 | A | 7/1990 | Pettigrew et al. | 340/551 |
| 4,960,651 | A | 10/1990 | Pettigrew et al. | 428/607 |
| 5,021,778 | A | 6/1991 | Walton | 340/825.54 |
| 5,038,023 | A | 8/1991 | Saliga | 235/385 |
| 5,062,151 | A | 10/1991 | Shipley | 359/154 |
| 5,099,227 | A | 3/1992 | Geiszler et al. | 340/572 |
| 5,172,829 | A | 12/1992 | Dellicker, Jr. | 221/13 |
| 5,182,570 | A | 1/1993 | Nysen et al. | 343/795 |
| 5,218,344 | A | 6/1993 | Ricketts | 340/573 |
| 5,287,414 | A | 2/1994 | Foster | 382/1 |
| 5,319,544 | A | 6/1994 | Schmerer et al. | 364/403 |
| 5,335,170 | A | 8/1994 | Petteruti et al. | 364/403 |
| 5,374,815 | A | 12/1994 | Waterhouse et al. | 235/383 |
| 5,402,104 | A | 3/1995 | LaRosa | 340/539 |
| 5,404,384 | A | 4/1995 | Colburn et al. | 377/6 |
| 5,426,284 | A | 6/1995 | Doyle | 235/385 |
| 5,434,775 | A | 7/1995 | Sims et al. | 364/403 |
| 5,448,110 | A | 9/1995 | Tuttle et al. | 257/723 |
| 5,510,770 | A | 4/1996 | Rhoads | 340/572 |
| 5,521,815 | A | 5/1996 | Rose, Jr. | 364/409 |
| 5,525,969 | A | 6/1996 | LaDue | 340/573.6 |
| 5,528,222 | A | 6/1996 | Moskowitz et al. | 340/572 |
| 5,533,079 | A | 7/1996 | Colburn et al. | 377/6 |
| 5,554,974 | A | 9/1996 | Brady et al. | 340/572 |
| D375,857 | S | 11/1996 | De Blois | D6/511 |
| 5,574,470 | A | 11/1996 | de Vall | 343/895 |
| 5,612,683 | A | 3/1997 | Trempala et al. | 340/825.31 |
| 5,627,520 | A | 5/1997 | Grubbs et al. | 340/572 |
| 5,635,693 | A * | 6/1997 | Benson et al. | 23/384 |
| 5,661,457 | A | 8/1997 | Ghaffari et al. | 340/572.7 |
| D383,341 | S | 9/1997 | Grosfillex | D6/511 |
| 5,671,362 | A | 9/1997 | Cowe et al. | 395/228 |
| 5,689,238 | A | 11/1997 | Cannon, Jr. et al. | 340/568 |
| 5,703,785 | A | 12/1997 | Bluemel et al. | 364/479.14 |
| 5,708,419 | A | 1/1998 | Isaacson et al. | 340/572 |
| 5,721,531 | A | 2/1998 | Garver et al. | 340/568.1 |
| 5,736,929 | A | 4/1998 | Schrott et al. | 340/572 |
| 5,739,765 | A | 4/1998 | Stanfield et al. | 340/825.49 |
| 5,768,921 | A | 6/1998 | Hill | 70/63 |
| 5,771,003 | A | 6/1998 | Seymour | 340/568 |
| 5,777,884 | A | 7/1998 | Belka et al. | 364/478.13 |
| 5,801,628 | A | 9/1998 | Maloney | 235/375 |
| 5,821,859 | A | 10/1998 | Schrott et al. | 340/572 |
| 5,934,499 | A | 8/1999 | van der Hoven | 220/475 |
| 5,936,527 | A | 8/1999 | Isaacman et al. | 340/572.1 |
| D415,367 | S | 10/1999 | Smith | D6/407 |
| 5,963,134 | A | 10/1999 | Bowers et al. | 340/572.1 |
| 6,054,924 | A | 4/2000 | Dames et al. | 340/572.6 |
| 6,075,441 | A | 6/2000 | Maloney | 340/568.1 |
| D429,093 | S | 8/2000 | Miller | D6/467 |
| 6,195,005 | B1 | 2/2001 | Maloney | 340/568.1 |
| 6,204,764 | B1 | 3/2001 | Maloney | 340/568.1 |
| 6,232,876 | B1 | 5/2001 | Maloney | 340/568.1 |

* cited by examiner

OBJECT CONTROL AND TRACKING SYSTEM WITH ZONAL TRANSITION DETECTION

This application claims the benefit of U.S. Provisional application No. 60/099,954, filed Sep. 11, 1998.

BACKGROUND OF THE INVENTION

Many objects have intrinsic value while other objects have value because they provide access to intrinsically valuable objects. For instance, jewelry, coins, automobiles, sensitive business files, and similar objects have intrinsic value. Accordingly, these items generally are secured against theft or misuse either by locking them in vaults or storage cabinets in the case of smaller objects, or by providing them with their own locking and security systems such as, for example, locks and security systems on automobiles. Keys to automobiles, storage cabinets, file rooms, or apartment complexes are examples of objects that have value because they provide access to intrinsically valuable objects.

The collection of keys to automobiles at an automobile dealership have substantial value because of the number of vehicles to which they provide access. Accordingly, such collections of keys have traditionally been either locked up or tracked in some way, not only to prevent theft of vehicles but also to allow sales and maintenance personnel to locate the keys to a vehicle quickly when the vehicle needs to be shown, test driven, or provided with maintenance. Tracking and control of access to these keys is therefore of critical importance to an automobile dealership.

In the past, a variety of systems have been implemented to track and control access to keys to vehicles in an automobile dealership. For example, peg boards have been used to keep track of keys as salespersons, maintenance personnel, and others remove keys for access to vehicles. Generally, sign-out sheets have been employed to log the check-in and check-out of such keys. Obviously, such a manual system of tracking has numerous shortcomings due in large part to the very real potential of human error and forgetfulness in carrying out the sign-in and sign-out procedures.

More recently, automated computer controlled key tracking systems have been implemented for tracking vehicle keys at automobile dealerships and other types of keys such as pass keys to the apartments of apartment complexes. One such system particularly applicable to the present invention and used widely at automobile dealerships is the key tracking system disclosed and claimed in my U.S. Pat. No. 5,801,628, the disclosure of which is hereby incorporated fully by reference. In this system, referred to herein as the "Key Track" system, keys to a vehicle are attached with a rivet or the like to a thin plastic key tag having a depending tongue. The tongue carries a small button-shaped electronic touch memory device, which stores a unique code. The tongues of the key tags are configured to be insertable in an array of slots formed in a top panel within a storage drawer. A printed circuit backplane is disposed beneath the array of slots and is provided with a plurality of pairs of upstanding metal contacts, each pair of contacts being aligned with a corresponding one of the slots. When the tongue of a key tag is inserted in a selected one of the slots, its touch memory device is engaged by the corresponding pair of contacts. The Key Track system may alternatively include radio frequency or RF tags rather than touch memory devices. In such an embodiment, the codes stored on the tags are communicated to RF sensors on the backplane, eliminating the need for physical contacts.

A computer based controller is electronically coupled through a communications buss such as a data matrix to the contacts or sensors on the backplane and periodically polls each pair of contacts or sensor, preferably several times per second, to determine the presence or absence of a touch memory device or RF tag and thus which slots in the storage drawer contain key tags and which do not. When a slot contains a key tag, the touch memory device of the tag is read to determine its unique code, from which the identity of the particular key on the tag can be determined through a table lookup. In this way, the absence or presence and location within the storage drawer of the key tags and their associated keys can be noted by the controller each time the array of contacts are polled. If a tag present in a slot on a prior polling is absent on a subsequent polling, then the controller notes that the tag and its key have been removed from the storage drawer. Conversely, if a key tag is detected in a previously empty slot, the controller notes that the tag and its key have been replaced in the storage drawer and also notes the location of the slot in which the tag resides. The removal and replacement or "check out" and "check in" of keys at the storage location is therefore continuously monitored.

An access feature of the Key Track system requires an authorized user such a salesperson needing a particular key to enter an ID code into the controller to unlock and access the storage drawer. The controller then informs the user of the location within the drawer of the key tag bearing the key, or, if the key has been checked out by another, so informs the user. When the history of check out and check in of key tags and their keys is combined with other available information, such as the time at which tags are removed and replaced and the identities of the persons who accessed the drawer and times of access, access to the keys in the drawer can be controlled and monitored, detailed tracking logs can be created, and queries can be made of the controller at any time to ascertain which keys are checked out and the identities of individuals who checked them out. This system greatly decreases instances of lost or hoarded keys, reduces the time required to find keys, and generally provides automatic tracking and control of the keys, and thus, to some extent, tracks the vehicles to which the keys provide access.

The Key Track system described above has proven extremely valuable in the tracking and control of keys. However, the tracking information available to the system is limited to the time that each key is checked out, the time it is checked back in, and the identity of the individual who accessed the key. Information about the disposition of the key in the interim between check out and check in, and more importantly the disposition and movements of the vehicle or object to which the key provides access have not been available to the Key Track system. Nevertheless, such information, if available, could be valuable to automobile dealerships for a variety of purposes. For example, such information, when coupled and integrated with already available information from the basic Key Track system, can enable compilation of statistics regarding the average lengths of test drives, which sales personnel take customers for test drives most often, and which test drives results in sales. In a broader sense, the ability to monitor the movement of vehicles accessed by checked out keys can allow dealerships to locate vehicles on a lot simply by issuing a query to the controller, to follow vehicle movements between designated areas or "zones" of the lot, to confirm that when a vehicle leaves the lot, its key has been checked out by a person authorized to take the vehicle, and to detect theft by sensing when a vehicle attempts to leave the lot without its key having been properly checked out. In a similar environment, a rental car lot, the ability to monitor the disposition of keys and movement of vehicles can prevent vehicles from leaving the lot without having been properly leased, allows rental vehicles to be located accurately and quickly, and deters theft. In all these situations there is a strong interest in tracking vehicle movements about a lot between the time when the keys to the vehicle are checked out and when they are checked back in and in determining when vehicles leave and when they return to the lot.

Thus, a need exists for a method and apparatus and an enhancement to the basic Key Track system to enable the system to track not only the check out and check in of keys, but also the interim movements of vehicles to which the keys provide access. It is to the provision of such a method and apparatus that the present invention is primarily directed.

SUMMARY OF THE INVENTION

Briefly and broadly described, the present invention comprises a system for tracking the movement of objects in a predefined area. The system includes a central computer or microprocessor based controller and a readable tag on each of the objects to be tracked. Preferably, the readable tags are radio frequency (RF) tags, which store unique codes identifying their corresponding objects and transmit their codes when appropriately activated. Readers, which preferably comprise RF sensors or antennas connected to local controller/receivers, are positioned at preselected locations within the predefined area for reading the codes of the readable tags as objects bearing the tags move past the readers. The preselected locations can correspond to transition regions between designated zones of the area within which the objects are to be tracked. Communication links connect the local controllers to the central controller. The central controller is programmed to collect data from the local controllers and to issue instructions to the local controllers for monitoring, tracking, and controlling the movement of objects within the predefined area.

A more specific and preferred embodiment of the invention, and the embodiment that forms the context within which the invention is described herein and that is considered the best mode of practicing the invention, comprises enhancements and improvements to the Key Track system disclosed in my U.S. Pat. No. 5,801,628 to adapt the system for use in tracking and controlling the movement of vehicles at an automobile dealership. It should be understood, however, that even though the invention is described in the context of such an embodiment for clarity, many other applications and embodiments, some of which are discussed in more detail below, are possible and all such applications and embodiments should be considered to be within the scope of the invention.

In the preferred embodiment, vehicles at a dealership are each provided with one or more RF tags and the dealership lot is organized into a number of logical zones, such as the service area, fueling area, areas outside lot exits, and the like. Tag readers are located at the transition regions between the zones and each tag reader includes a local controller and one or more antennas or other appropriate sensors, preferably embedded within the pavement at the transition regions. The local controllers are connected through communications links to the central Key Track system controller, which also monitors and controls access to keys to the vehicles as previously described. The communications links can be one of many possible types of data links including, for example, RS232 lines, ethernet links, or parallel or serial communications busses.

As vehicles are moved from one zone of the lot to another, they pass the tag readers at the transition regions, where the RF tags of the vehicles are activated to transmit their unique codes, which are received by the local controllers and conveyed to the central controller. The central controller can thus determine the movement of each vehicle about the lot as well as movement of vehicles off of and onto the lot through the lot exit. This information is combined with information maintained by the Key Track system about the disposition of the keys to each vehicle, such as the identity of the person who checked out the keys, to provide substantially improved and enhanced monitoring and control of vehicle movement. For example, if a vehicle approaches the exit to leave the lot, the central controller is able to determine whether the individual who checked out the keys has authority to remove the vehicle from the lot. If so, a gate can be opened and if not appropriate alarms can be generated. Further, and even more significantly, the system provides automatic day time security against theft without the need for gates or other physical barriers. More specifically, if a vehicle is detected by a reader and its key has not been checked out, then a theft is indicated and appropriate alarms or remedial actions can be taken. In addition to authorizing vehicle movement and providing security, useful data such as the length of test drives, maintenance histories, fuel usage, and the like becomes readily available to the dealership through the present invention and can be used to improve procedures and ultimately provide better service to the customer.

Many other embodiments and implementations of the present invention are possible, both within the context of an automobile dealership and otherwise. For example, the invention can be implemented with advantageous results in an automobile rental lot or any place where vehicles or, indeed, any mobile objects need to be tracked. Placement of two reader antennas in close proximity and/or two RF tags on a vehicle enhances the ability to determine the transition of a vehicle from one zone to another and provides built in system redundancies. If desired, the monitored zones within a parking lot can be as small as one parking space so that the precise location of each vehicle in the lot can be determined.

Other applications and embodiments of the invention include controlling access to and tracking the movement of sensitive or confidential files within a file room, tracking the check out and movement of expensive tools at a work site, the tracking and control of access to evidence in a court's evidence room, and other applications where tracking the movement of and controlling access to objects is desirable.

Thus, a method and system is now provided that enhances the Key Track system by adding the capability not only to log check out and check in of keys, but also to monitor and collect information about and authorize the movement of vehicles corresponding to the keys. The collected information is transmitted to the Key Track controller where it is combined and strategically integrated with existing information about the disposition of keys to provide valuable reports and to control ingress and egress to the lot or between various zones of the lot. The combined information can be used for other purposes, such as scheduling and tracking maintenance schedules where vehicles naturally move from one zone to the next as part of the maintenance process. In a broader sense, monitoring and control of access to and movement of many types of portable objects is possible with this invention. These and other applications, features, objects, and advantages of the invention will become more apparent upon review of the detailed description set forth below taken in conjunction with the accompanying drawing figures, which are briefly described as follows.

DETAILED DESCRIPTION OF THE PREFERRED EMBODIMENT

As mentioned above, the invention is described herein within the context of tracking movements of vehicles within an automobile dealership and specifically the strategic integration of such tracking with an existing Key Track system, which is described in detail in the incorporated disclosure of U.S. Pat. No. 5,801,628. Many other applications and embodiments are possible and some are described in more detail below. Further, the system and method of this invention makes use of a variety of electronic components such as RF tags and RF tag readers. In general, the construction and operation of such components is beyond the scope of the present invention and will not be described in detail. However, such components are commercially available and their use and electronic interconnections is generally known to those of skill in the art. For example, Radio Frequency Identification (RFID) products, including RF tags and readers are available from Texas Instruments, Inc., which markets both paper tags under the trade name "Tagit" and glass capsule tags. SCS, Inc. markets RFID products under various trade names including DuraLabel and Trolleyponder and licenses the technology of these devices. Other companies including Phillips and AEG also offer RFID products. Many of these commercially available products are suitable for application in the present invention.

While a detailed description of RFID hardware and techniques is not necessary, a general overview is helpful. Most commercially available RF tags and reading systems rely on low frequency magnetic field coupling for communication. RF tag readers in many instances include a multi turn loop antenna with a large number of loops to maximize the magnitude of the magnetic flux generated by the antenna and thus its range. Other types of antennae are possible including capacitively coupled antennas, dipole antennas, and the like. Many RF tags are passive devices that store a unique code and are powered by capturing a fraction of the energy radiated by the reader's antenna when the tag is in the vicinity of the antenna. More specifically, RF tags typically consist of a small antenna coupled to an integrated circuit chip, which includes a memory for storing an ID code and perhaps other information and controlling mechanisms for transmitting the code to be received by the reader's antenna. These passive tags include power regulation hardware to capture a fraction of the incident power from the reader's antenna and to charge a capacitor, which acts as a local battery. The power-on/reset circuitry causes the integrated circuit to activate and begin operation when operational power levels are sufficient.

Once energized and activated, the RF tag communicates with the reader by modulating the induced radio frequency currents with the unique ID code. The reader, in turn, includes demodulation circuitry, which interprets the received modulations to extract the code. In this way, the unique code stored in the RF tag is transmitted to the reader. The reader can then convey this code through an appropriate communications link (for example a parallel or serial communications buss, RS 232 link, ethernet link, wireless communications link, and the like) to a remote controller or computer. Active RF tags are also available commercially as alternatives to passive tags. Generally, these tags have an on board power source and many are able to receive and store data as well as to communicate data to a reader, as do passive tags. Typical frequencies of operation of RF tags range from as low as 125 KHz to 13.56 MHz and to as high as 2.4 GHz, although other frequencies are possible. It should be noted that whereas the term "radio frequency" is considered by some to include only the portion of the electromagnetic spectrum between 9000 Hz and 3000 GHz, this term, as used and intended in the present disclosure, is meant to include any appropriate portion of the electromagnetic spectrum whether within or outside this range.

Figure 1:
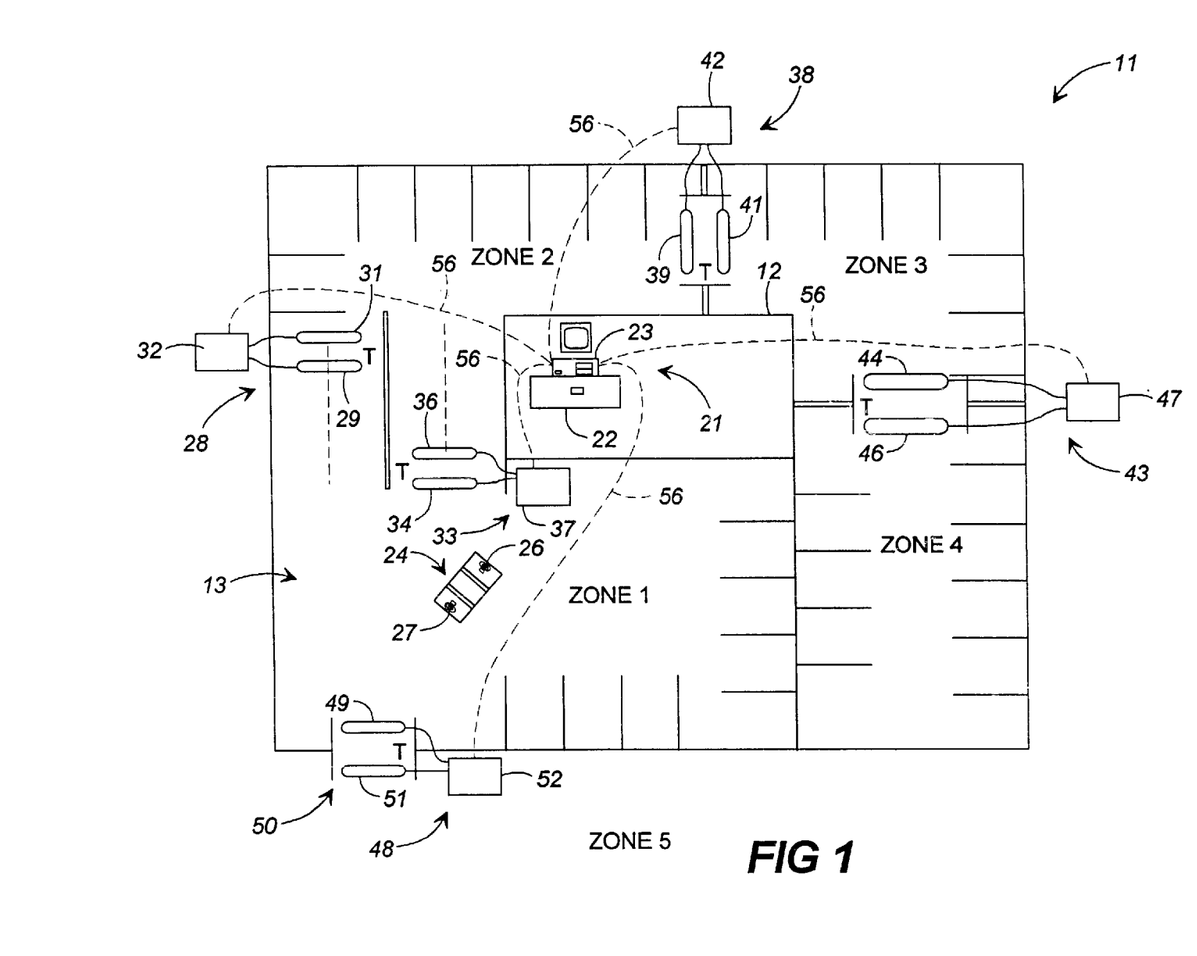
FIG. 1 is a simplified diagramatic sketch of an automotive dealership subdivided into zones and illustrating the present invention in a preferred embodiment thereof.

With this background in mind, reference will now be made in more detail to the drawings, in which like numerals refer to like parts throughout the several views. FIG. 1 is a diagramatical plan view of an automotive dealership 11 having a showroom 12 surrounded by a paved lot 13. The lot 13 is partitioned into a number of discrete areas referred to herein as zones with each zone representing a region of the lot where vehicles may be located from time to time. Zone 1, for example may be a parking area of the lot where vehicles are displayed for sale. Zone 2 may be an additional parking area or perhaps a fueling or washing area while Zone 3 may be a service staging area and Zone 4 a service facility. Obviously, a lot may be subdivided into more or fewer zones than those illustrated in FIG. 1 and the zones may correspond to any number of types of regions where vehicles may be located. Also, Zone 5 may be considered to be the region outside the lot and off the premises of the dealership. The various zones of the lot 13 are separated by transition regions, designated by the capital letter T in FIG. 1.

A Key Track system 21 as disclosed in U.S. Pat. No. 5,801,628 is located in the showroom 12 of the dealership 11. In general, the Key Track system comprises one or more storage drawers 22 for storing keys and from which keys may be checked out and checked back in. A computer or microprocessor based central controller 23 is coupled to the storage drawer 22 as described in said patent. In general, the controller 23 receives requests from users for keys, opens the drawer 22 if the request is from an authorized user, and logs when keys are removed from and returned to the storage drawer.

An RF tag reader is located at each transition region T separating the various zones of the lot. For example, RF tag reader 28 is located in the transition region T from Zone 2 to Zone 1, reader 33 is located in the transition region T from Zone 1 to Zone 2, reader 38 is located in the transition region between Zones 2 and 3, Reader 43 is located in the transition region between Zones 3 and 4, and reader 49 is located in the transition region, which is the lot exit, between Zones 1 and 5, outside the lot. RF tag reader 28 comprises a pair of loop antennas 29 and 31 respectively, which preferably are buried in the pavement of the lot in the transition region T. Alternatively, the antennas can be located in vertical upstanding pylons or in an overhead structure, but burial beneath the pavement is preferred and is considered to be the best mode of practicing the invention because the antenna is more secure, more tamper resistant, and hidden from view.

The loop antennas 29 and 31 are connected to a local controller 32, which is configured to energize the antennas, to transmit and receive modulated radio frequency signals therefrom, and to demodulate received signals to extract data, such as identifying codes, received by the antennas. Similarly, reader 33 includes buried loop antennas 34 and 36 connected to local controller 37, reader 38 includes buried loop antennas 39 and 41 connected to a local controller 42, reader 43 includes loop antennas 44 and 46 connected to local controller 47, and reader 48 includes buried loop antennas 49 and 51 connected to local controller 52.

The local controllers 32, 37, 42, 47, and 52 are electronically coupled through appropriate communications links, generally indicated by dashed lines and the reference numeral 56, to the central controller 23 of the Key Track system 21. As mentioned above, the communications links can be any of a number of connections appropriate for bi-directional communication between the local controllers and the central controller 23. Data transmission links, protocols, and techniques are well know to those of skill in the art and need not be described in detail here. A more detailed description of one type of data transmission technique that may be applicable to this invention is disclosed in the incorporated disclosure of U.S. Pat. No. 5,801,628. By means of the communications links 56, the various local controllers are able to transmit data and information to the central controller 23 and the central controller 23 can transmit data and information to the local controllers.

A vehicle, generally indicated at 24, is shown on the lot 13 and is arbitrarily located in Zone 1 of the lot. While only one vehicle is illustrated in FIG. 1 for clarity, it will be understood that a dealership may house dozens or hundreds of vehicles and that the present invention applies equally to large numbers of vehicles on the lot. The vehicle 24 is provided with one or more, and preferably a pair, of RF tags referred to with the reference numerals 26 and 27 in FIG. 1. RF tag 26 is attached to the front of the vehicle while RF tag 27 is attached to the rear of the vehicle. Several physical locations for attaching the RF tags are envisioned. In general, locations that offer easy installation of tags, that are not obvious to the casual viewer, and that make it difficult to remove the tags are desirable. Potential locations include on plastic wheel wells inside the engine compartment, on fiberglass bumpers or other non-metal body parts, or embedded within rubber tires. In general, RF tags need to be placed on non-metallic surfaces; however, at least one manufacturer of RF tags reports tag functionality in close proximity to metal surfaces such as steel I-beams.

The system illustrated in FIG. 1 may be configured to carry out the method of the present invention, in one embodiment thereof, as described below. It should be understood that while each transition region T in FIG. 1 is illustrated with a pair of buried antennas and the vehicle is illustrated with a pair of RF tags, the invention also contemplates the use of a single antenna at each transition zone and/or a single RF tag on each vehicle or any combination thereof. These various configurations are described in more detail below.

When a salesperson or other authorized user desires to access a vehicle on the lot for purposes, for example, of a test drive, maintenance, cleaning, etc., the Key Track system 21 is used as described in U.S. Pat. No. 5,801,628 to retrieve the key to the vehicle. In general, the user enters his or her identification number into the central controller 23 and identifies the vehicle for which access is desired. If the user is authorized to have access to the vehicle, the Key Track system unlocks the storage drawer 22 and indicates to the user which slot within the drawer the key is located. The user then takes the key, whereupon the central controller 21 notes the time the key was taken and the identity of the user who took it.

The user then uses the key to access the vehicle 24. As the vehicle is driven about or off of the lot 13, the readers in the various transition regions detect movement of the vehicle past each transition region by receiving the unique code of the vehicle from the RF tag or tags 26 and 27 on the vehicle. This information is transmitted via the communications links 56 back to the central controller 21. The central controller may use the information to make a variety of decisions each time movement of the vehicle past a transition zone is detected. For example, if the user is a member of the maintenance crew, that user may be authorized to move the vehicle only within the bounds of the lot 13 and into Zone 4 for maintenance. In this event, if the central controller receives the vehicles identification code from local controller 52 at the exit portal 50, a decision may be made that the user who checked out the key to the vehicle is not authorized to remove the vehicle from the lot. The central controller may then generate appropriate alarms and/or send instructions back to the local controller 52 via the communications link 56 instructing it not to open the exit gate. In this way, users not authorized to remove vehicles from the lot are prevented from doing so. The system also is uniquely suited to provide automatic security without gates. For example, if a vehicle is detected approaching an exit and the Key Track system determines that the key to the vehicle has not been checked out of the Key Track system, then a possible theft can be considered to be in progress and alarms can be sounded, a signal can be sent to the RF tag on the vehicle to disable the vehicle, etc. Thus, theft of vehicles on the lot is virtually eliminated.

If the user stays within the lot, the central controller receives data from the local controllers as the vehicle passes each transition zone. The central controller can then create logs of vehicle movement from zone to zone, locate the vehicle in a particular zone if its whereabouts in desired, and create reports useful to the dealership such as, for example, maintenance schedules, times required for maintenance, etc. When the user finishes with the vehicle, the key is returned to the Key Track system 21, which notes that the key has been checked back in and its location within the storage drawer In another example, a salesperson may retrieve a key from the Key Track system to access a vehicle for a test drive. Since this user is authorized to remove the vehicle from the lot, detection of the vehicle approaching the exit portal 50 will result in an instruction from the central controller to open the gate to allow the vehicle to be removed from the lot. If there is no gate at the exit, which usually is the case, the vehicle will simply be allowed to exit without an alarm being generated. When the vehicle returns, it is again detected entering the exit portal and this information is transmitted via the communications link 56 to the central controller 23. From information such as this, the central controller can track the whereabouts of the vehicle, compile useful reports regarding, for example, average lengths of test drives for each salesperson, ratios of sales to number of test drives for salespersons, and the like, and provide security against unauthorized use or theft.

Some specific examples of applications of the present invention in the context of an automotive dealership will be described in more detail with reference to FIGS. 2 through 5. In general, however, it will be seen that the method and system of this invention allows tracking not only of the check out and check in of keys to vehicles, but also of the movement of vehicles about and off of the lot. A substantially enhanced level of tracking, control, and security is therefore possible. The zone in which each vehicle resides on the lot is known by the central controller at all times and this information can be conveyed to a user when a key is checked out so that the vehicle can be located quickly on the lot.

Further, while the zonal transition approach can be applied on a macro scale as indicated in FIG. 1 wherein several vehicles can be located in a zone, it also can be applied on a micro scale or a combination of macro and micro scales if desired. In a micro configuration of the invention, zones can be defined such that each zone can contain only one vehicle. For example, micro zones might be defined as individual parking spaces on the dealership lot with each parking space being provided with its own RF tag reader. The readers at each micro zone are be in continuous communication with vehicles located in the various parking spaces and transmit this information to the central controller. In this way, the precise location of vehicles can be determined as well as detailed logs of when vehicles are removed from parking spaces, when and in which parking space they are returned, and their movements about or off of the lot in the interim. In this regard, a micro zonal configuration of the invention is in some respects an extension of the Key Track system itself wherein the objects being tracked are keys rather than vehicles and each micro zone corresponds to a slot in the storage drawer. Any combination of micro and macro zones can be established.

The antennae, sometimes called the sensors, of the RF readers most preferably are controlled by their respective local controllers, which also may be embedded or buried beneath the surface, instead of being connected directly through a "dumb" local interface to the central controller. The control functionality is distributed to the local level to insure continued functionality if the data link to the central controller of the Key Track system is disrupted. Further, the local controller is better able to sense tampering with the reader system. For example, if an antenna of a reader is cut or disconnected, the resultant change in impedance can be detected easily by the local controller whereas the central controller connected through a dumb interface likely would only see no signals from the antenna and the system would be vulnerable to defeat by tampering.

In a configuration where active two way RF tags are attached to vehicles, smart local controllers can send data and information to the active RF tags. This allows a local controller whose link to the central controller may be disrupted to attempt to transmit data by "piggybacking" on RF tags; i.e., storing information for the central controller on an RF tag for being conveyed to the central controller when the tag is encountered by a subsequent reader. In addition, active RF tags make possible an embodiment of the invention wherein ID markers are positioned in the lot at various locations and are "read" by the active tags as vehicles carrying the tags pass over the markers in moving about the lot. The RF tags themselves are then responsible for transmitting location information directly via radio frequency transmission to the central controller. In a broader sense, the use of RF tags that can receive and store information gives rise to the possibility of a "virtual network" wherein information can be transmitted to and stored on the ID tags themselves for reading at a later time by another reader at another location. Service history, for example, might be stored and automatically read each time a vehicle is presented at a service center for maintenance or service.

Since the local controller in the preferred embodiment is in real-time communication with RF tags passing its antenna, it can send information to the tags, the central controller, and/or directly to activate ancillary equipment such as, for example, security devices and alarms and video and/or audio capturing equipment. This is a powerful attribute of the present invention. For example, if a series of captured video frames of vehicles traversing a portal are OCR processed, the license plate of vehicles with inoperable or no RF tags can be noted (presumably some other sensor such as a laser beam indicating a portal transition would alert the central controller, which would determine that a vehicle traversed the portal but no signal was received from an RF tag). Cross linking to license plate databases to note potential prospects who were not helped by a sales professional would provide extremely useful information to the dealership. Accordingly, it will be seen that the potential to monitor and adjust the day-to-day operation of the dealership can be enhanced significantly through application of the present invention.

Figure 2:
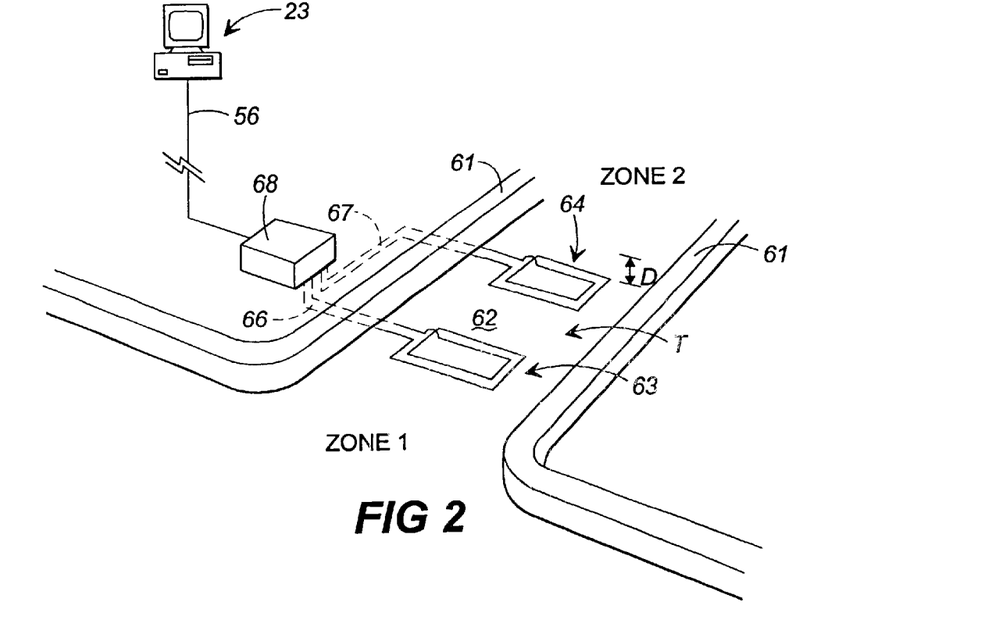
FIG. 2 is a perspective illustration of a zonal transition region within an automotive dealership showing the embedded antennae and local controller of the tag reader.

FIG. 2 illustrates in more detail a transition region T between two zones, Zone 1 and Zone 2, within a dealership parking lot. Preferably, but not necessarily, the transition region T is bordered by curbs or other barriers 61 to force vehicles to traverse the transition region T at the proper location. A pair of spaced apart loop antennas 63 and 64 are embedded or buried within the pavement 62 at the transition zone T. The antennae are connected by appropriate cabling 66 and 67 respectively to a local controller 68, which also may be buried if desired. The local controller 68, in turn, is connected via the communications link 56 to the central controller 23, which preferably is part of a Key Track system.

As a vehicle bearing one or more RF tags moves from Zone 1 to Zone 2, it traverses the transition region T and passes over the antennae 63 and 64. The RF tag is activated by and, in the case of a passive tag, draws power from the field generated by the antennae and transmits its unique code, which is detected by the antennae, demodulated by the local controller 68, and conveyed via communications link 56 to the central controller for processing. The central controller then interprets the data to determine that the vehicle corresponding to the code is passing from Zone 1 to Zone 2. Movement of vehicles from zone to zone is thus tracked and monitored. FIG. 2 illustrates the tag reader with a pair of spaced antennae or sensors buried in the pavement. While this is a preferred configuration for purposes of system robustness, as detailed below, a single antenna may also be used with similar, albeit less robust, results.

Figure 3:
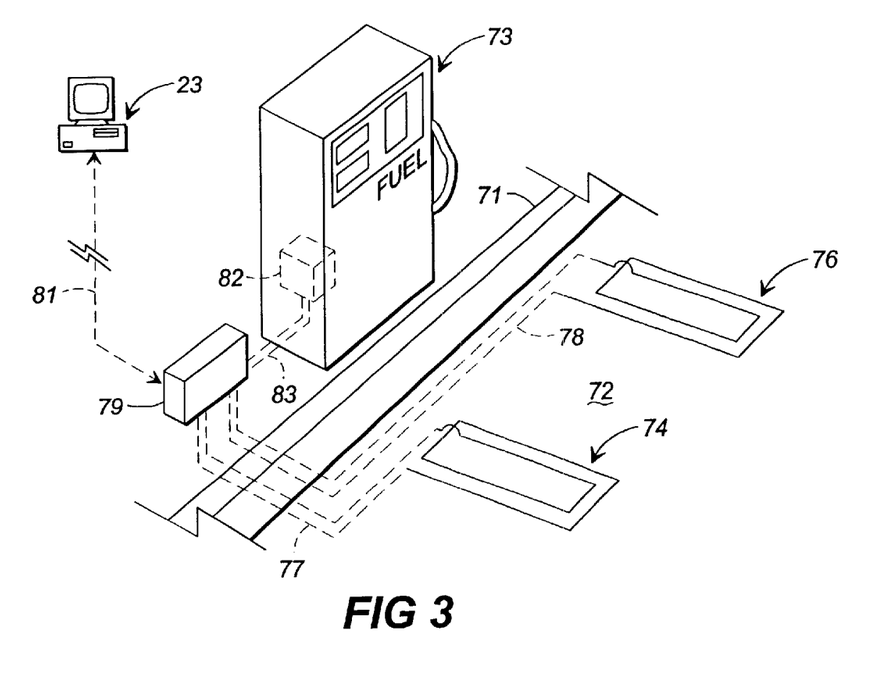
FIG. 3 is a perspective view illustrating application of the present invention to control operation of a fueling station in an automotive dealership.

FIG. 3 illustrates a particular application of the system and method of the invention applied to a fueling station at an automobile dealership. A fueling pump 73 is stationed by a curb 71 for delivering fuel to vehicles. A pair of antennas 74 and 76 are embedded within the pavement 72 adjacent the pump 73. The antennae are connected via appropriate cabling 77 and 78 respectively to a local controller 79 which is coupled through communications link 81 to central controller 23. The pump 73 is provided with a pump controller 82, which includes a switch for activating the pump and may also include circuitry for capturing information from the pump such as, for example, the amount of fuel pumped at a filling, and conveying this information back to the local controller 79 for transmission to the central controller 23. When a vehicle approaches the fuel pump 73 for fueling, the unique code of its RF tag is captured and transmitted by the local controller to the central controller. The central controller then checks its Key Track logs to confirm that the user who checked out the keys to the vehicle is authorized to fuel the vehicle. If not, the central controller may transmit an instruction to the local controller not to activate the pump and may also generate appropriate alarms to indicate an inappropriate fueling attempt.

If the user is authorized to fuel the vehicle, the central controller may issue instructions to the local controller to activate the pump, whereupon a signal is sent from the local controller to the pump controller to allow the pump to be operated. When fueling is complete, the pump controller may convey to the local controller information regarding the amount of fuel used and this information is conveyed back to the central controller. Alternatively, the initial instruction to the pump controller may be to pump only a predetermined amount of fuel. Thus, unauthorized fueling is prevented and fuel usage can be monitored and controlled on an individual vehicle level to insure the most efficient use of fuel in the daily operation of the dealership. Preferably, the two antennae adjacent to the pump are spaced such that each must receive a code from a respective RF tag on the vehicle to authorize pumping. This ensures that the vehicle is properly positioned for fueling and prevents fraud by, for example, stationing one vehicle with one of its RF tags over an antenna while backing an unauthorized vehicle up to the pump for illicit fueling.

Figure 4:
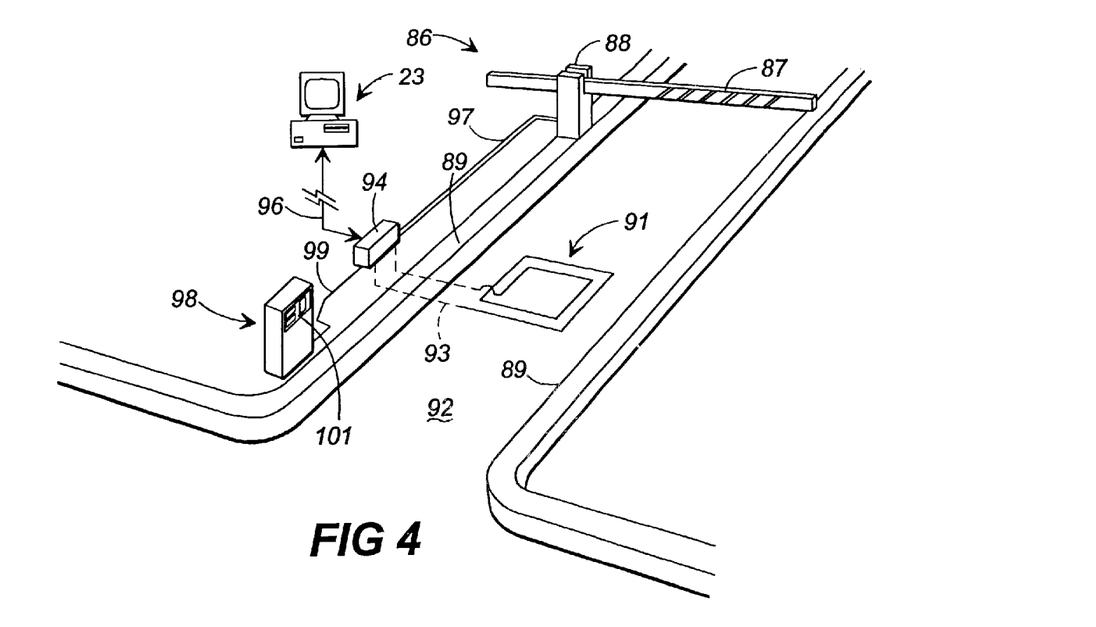
FIG. 4 is a perspective view illustrating application of the present invention to monitor and control ingress and egress at an automotive dealership.

FIG. 4 illustrates application of the invention at an exit portal of the dealership lot to monitor and control the comings and goings of vehicles from the lot. The exit portal is bordered by curbs 89 and an antenna 91 is embedded within the pavement 92 of the portal. The antenna is connected by cabling 93 to the local controller 94, which is coupled through communications link 96 to the central Key Track controller 23. The local controller is also connected by cabling 97 to a gate control 88, which can be activated to raise and lower a gate 87 to allow or prevent a vehicle from passing through the exit 86. The local controller 94 may also be connected to receive information from a key pad 101, which can be conveniently located on a key pad pedestal 98.

In operation, as a vehicle approaches the exit, the unique code of its RF tag is transmitted to the local controller 94 and conveyed to the central controller 23. The central controller consults its Key Track logs to determine the identity of the user who checked out keys to the vehicle. If the user is not authorized to remove the vehicle from the lot, the central controller may generate appropriate alarms and convey instructions to the local controller not to open gate, thereby preventing unauthorized removal of the vehicle from the lot. If the user is authorized to remove the vehicle from the lot, the central controller may transmit instructions to the local controller to open the gate, whereupon an appropriate instruction is transmitted to the gate control 88 to open the gate 87 and allow the vehicle to leave the lot.

The user may also be required to enter a PIN number into the key pad as a final confirmation that the vehicle is properly being removed from the lot. The PIN number is communicated to the local controller via cabling 99 and, possibly, on to the central controller 23. Only if it is determined that the vehicle is authorized to leave the lot, that the person who checked out the keys is authorized to take the vehicle off the lot, and the appropriate PIN number is entered will the gate be opened. Accordingly, in the event, for example, that a would be thief disables a salesman and attempts to remove a vehicle from the lot, the thief will not be able to drive the vehicle off the lot because the appropriate PIN number will not be entered. Such a system may also be used in other situations such as, for example, at the exits from an apartment complex to prevent vehicles of tenants from being stolen by requiring both a proper identification of the vehicle through its RF tag and the proper PIN number before a gate is opened.

Figure 5:
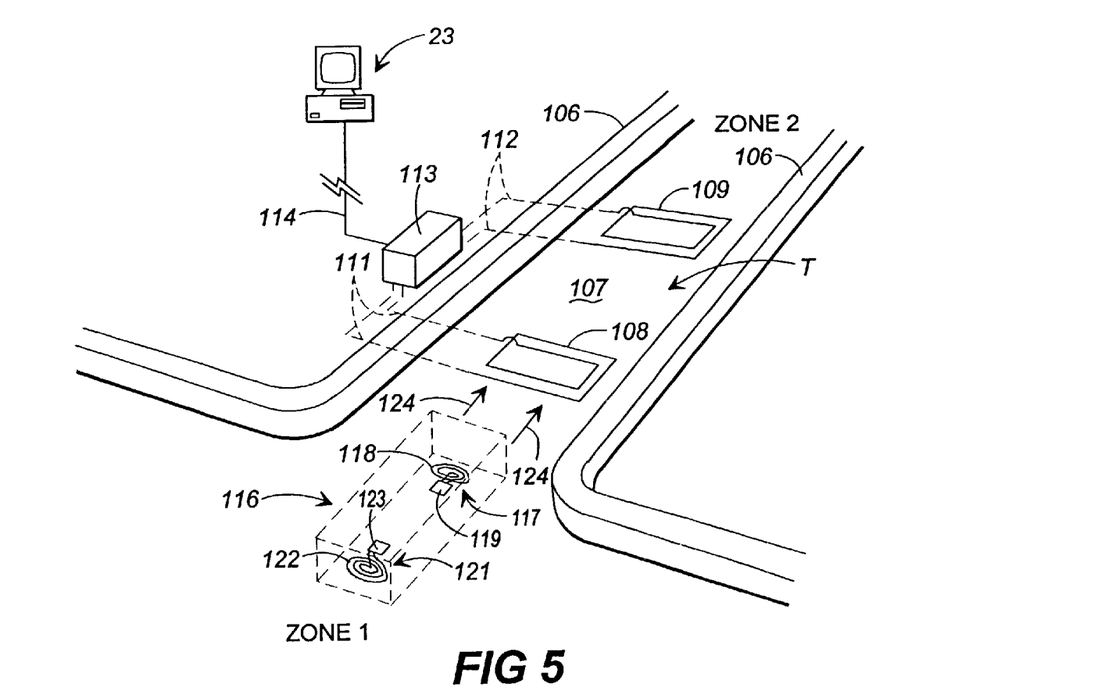
FIG. 5 is a perspective view illustrating the approach of a vehicle equipped with RF tags at a transition region between zones of an automobile dealership.

FIG. 5 will now be referenced as the foundation of a discussion of the various configurations of readers and RF tags and the advantages of each configuration. FIG. 5 illustrates a transition region T disposed between two adjoining zones, Zone 1 and Zone 2, on the lot of an automobile dealership. A pair of spaced apart antennas 108 and 109 are embedded within the pavement 107 in the transition region T and each is connected by cabling 111 and 112 respectively to a local controller 113. The local controller 113 is coupled through communications link 114 to a central Key Track controller 23. A vehicle 116, indicated generally by phantom lines for clarity, is seen approaching the transition region T in direction 124 from Zone 1 toward Zone 2. The vehicle 116 is provided with a forward RF tag 117, which includes an antenna 118 connected to an integrated circuit chip 119 containing the encoding, decoding, control, and memory circuits of the RF tag. A rear RF tag 121 is provided at the back of the vehicle and includes an antenna 122 connected to an integrated circuit chip 123. The RF tags are shown very much larger than their typical actual size for clarity of illustration. In reality, RF tags can be as small as a postage stamp or even smaller and are easily attached and hidden on the vehicle. In the case of smaller tags, the reader antenna can be larger to maintain operating range.

FIG. 5 shows a reader with two embedded antennae and two RF tags on the vehicle. However, the invention contemplates multiple variations and combinations of reader antennae and RF tags including a single reader antenna and single RF tag, double reader antennae and a single RF tag, and the double reader antenna double RF tag configuration illustrated in FIG. 5. The simplest of these configurations is a single reader antenna and a single RF tag on the vehicle. With such a configuration, as the vehicle moves from one zone to an adjacent zone, it is confined to pass through the transition region T and over the reader antenna embedded in the pavement thereof. As the RF tag on the vehicle enters the field created by the reader antenna, it is activated by the field and transmits its unique code as described above and the code is received by the reader antenna and ultimately conveyed to the central controller. The RF tag may also accept and store information, which can be read by other readers on site or at another location. For example, RF tags might store information regarding the history of a vehicle's progress through the manufacturing plant, shipping channels, dealerships, and ultimately to a customer.

Since only a single reader antenna and a single RF tag is used, the central controller's vehicle tracking routines must rely on past history data to extrapolate and update the location of the vehicle. More specifically, since the last logged location of the vehicle (FIG. 5) is known to be in Zone 1, and since it is now being detected in the transition region T separating Zone 1 and Zone 2, a conclusion may be made that the vehicle can now be considered to be in Zone 2 until again detected at a transition region. While such a system is relatively simple, it lacks a degree of rigor that is desired in many situations. For example, if the history data is corrupt and the vehicle is not in reality in the region that the central controller thinks it is, then an inaccurate conclusion as to the new location of the vehicle may be made or an error condition may be generated. Error conditions may also be created if, for example, a vehicle begins to pass through a transition region and then is reversed and backed into its original Zone.

It can thus be seen that while the single reader/single tag configuration may be useful in some situations, it can be subject to mistakes and errors that may not always be acceptable. One reason that errors may be generated is because, with a single reader and a single tag, no information is available to the system regarding the direction in which the vehicle is traversing the transition region. Only the location of the vehicle at the transition can be determined.

A more rigorous configuration of the invention is realized by the use of two spaced reader antennas embedded in the pavement at the transition region and a single RF tag attached to a vehicle. As the vehicle traverses the transition region, the first reader antenna encounters and activates the RF tag and reads its unique code, which is conveyed to the central controller. At this point, the second reader antenna cannot read the transmitted code because of the physical separation of the reader antennas. Eventually, the RF tag moves with the vehicle out of the range of the first reader antenna and enters the range of the second reader antenna. The RF tag is energized a second time by the second antenna and transmits its unique code, which is received by the second antenna.

It will thus be seen that the local controller first receives the code from its first reader antenna and then receives the code from its second reader antenna. With this information, the central controller (or the local controller for that matter) can safely conclude that since the vehicle traversed the transition region in a direction from the first reader antenna toward the second reader antenna, the vehicle moved from Zone 1 into Zone 2. Since no reliance is made on knowledge of where the vehicle was located prior to its traversal of the transition region, a two reader antenna/one RF tag configuration provides more rigor and is less susceptible to error and inaccurate location that the single reader antenna/single RF tag configuration. In fact, since the new Zone and transition region traversed are safely known, if the location history data base is corrupted or contains data inconsistent with this determination, an error or suspicious condition can be flagged. A log of such suspicious conditions can then be examined by key personnel to determine if a pattern suggests that a particular reader is faulty or someone has tampered with the readers or RF tags. Thus, this configuration is substantially more reliable than the simple one reader/one RF tag configuration.

Another more rigorous configuration of the invention is the one reader antenna/two RF tag configuration wherein two RF tags are placed on each vehicle and one reader antenna is embedded in a transition zone. Such an arrangement is feasible for use with vehicles since a typical car or truck is relatively large and the RF tags can be spaced apart a distance larger, and preferably at least twice as large, as the operating range of the reader antennae. With such a configuration, as a vehicle traverses a transition region, the RF tag on the front end of the vehicle encounters the reader antenna and transmits its code followed by the RF tag on the rear of the vehicle. The local controller, or alternatively the central controller, can access its data base to identify the vehicle provided with the codes of the two RF tags and which of the two codes corresponded to the forward RF tag and which to the rear RF tag.

Thus, the direction of traversal of the transition region is reliably determined from the encounter. If the vehicle stops in the transition region and reverses course, either only 1 of the tags is read or the first tag's code is received twice with the second tag being read only once or not at all. From this information, the activity of the vehicle in the transition region can be determined. However, in such a situation, since the direction of traversal is not obtainable from the data, previous zone information still is needed to extrapolate the zone in which the vehicle is now considered to be located. While periodic database inventory checks can mitigate the potential uncertainties of relying on previous zone information, the potential for errors still exists.

The most rigorous configuration of the invention is the two reader antenna/two RF tag configuration illustrated in FIG. 5. Such a configuration eliminates reliance on previous zone information and also provides a level of redundancy that enhances the reliability of the system. For example, consider when a vehicle traverses a transition region T between Zone 1 to Zone 2. As the vehicle moves through the transition region, the first reader antenna interrogates the first RF tag and then the second RF tag. The second reader antenna also interrogates the first and then the second RF tag, although this pair of interrogations occur later in time than the interrogations by the first reader antenna. The local and/or the central controller can then determine, based on various combinations of this data, that a particular vehicle passed in a particular direction into a Zone adjacent to the transition region. Thus, the precise zonal location of each vehicle can be known at all times.

Further, because more data is collected than the minimum required, the extra data provides a level of redundancy. For example, of one reader antenna malfunctions, the local controller can process the received information as if the system were configured as a two RF tag/one antenna system as discussed above. Similarly, if one of the RF tags malfunctions, the local controller can process the information as in a one RF tag/two reader antenna configuration. Finally, if both a reader antenna and an RF tag malfunctions, then the data can be processed as if the system were configured in a one reader antenna/one RF tag system. Such redundancy allows the local controller to continue to track zonal transitions and update the position database with different levels of confidence and also allows for the detection and logging of system malfunctions observed during each traversal of a transition region by a tagged vehicle. Defective RF tags can be flagged for replacement and faulty readers flagged for periodic maintenance.

In addition to providing direction of traversal information, a configuration incorporating two reader antennae can also estimate the speed at which the vehicle traversed the transition zone or passed the reader. Such information can be helpful in controlling speeding within a lot or other designated area.

Instead of requiring a relatively large physical separation between RF tags in multiple RF tag configurations, the two RF tags can alternatively be selected to operate at different radio frequencies. This allows the RF tags to be located closer together than the range of the reader antenna to a large degree. However, a key to a dual RF tag approach is the exploitation of the order in which the RF tags are encountered to determine direction of travel. Therefore, in multiple frequency systems, the area of non-overlap must remain large enough to allow sufficient communication time before the overlap region is encountered. In reality, the size of the non-overlap region does not need to be very large because RF tag technology allows RF tags to be interrogated in much less that 0.1 second. Obviously, the size of the region of non-overlap is determined to some degree by the speed at which vehicles traverse transition regions, but in a dealership situation, these speeds tend to be relatively low and do not present an obstacle to close placement of the RF tags on vehicles.

Also, communication strategies exist that allow two closely spaced RF tags operating on the same frequency and both within a reader antenna's range to be interrogated. These communication strategies allow the readers to communicate with multiple RF tags in their range of operation. Generally, these strategies require one reader antenna to be designated master and the other the slave. Only one antenna, the master, issues a request for RF tags to relay codes to both receiving antennas (master and slave).

The invention has been described herein within the context of the tracking and control of keys and vehicles at an automobile dealership. While this is a preferred embodiment of the invention and represents what is considered to be the best mode of carrying out the invention, the invention is far from limited to such a context and has a wide variety of applications outside automotive dealerships. For example, there exists a critical need within certain organizations such as classified government installations, hospitals, and the like to control access to and tracking of the location of confidential or classified files. The present invention can be applied to these situations to, for example, prevent classified files from being removed from specified locations by persons not authorized to remove them. Here, the files themselves are provided with RF tags and correspond to the vehicles of the preferred embodiment and the designated rooms (file rooms, review areas, and the like) correspond to the various zones. Locking doors controllable by the central controller preferably are provided at the transitions between rooms and only unlocked if an individual attempting to move a file from one room to another has authority to do so.

Another application is the tracking of personnel in automotive dealerships or otherwise. In such a scenario, an arm band might contain an RF tag. Readers located at key doorways and/or key locations interrogate the tags of personnel moving through the doorways to track the location of personnel at all times. Personnel passing through certain designated doorways, e.g. sensitive area entrances or exits, might activate appropriate alarms.

Similarly, children in schools can be tracked by issuing ID badges bearing RF tags to each child and adult. The passage of individuals through key portals is detected by readers located at these portals. Secondary sensors note the passage of individuals and if no RF tag is read, then alarms can be generated to indicate that a non-badged individual passed through the portal.

Factories have problems with workers clocking in and then not going to their assigned work areas. Worker ID badges bearing RF tags and readers at portals to work areas can be employed to track workers and insure that they are at their designated stations. These and other applications of the object tracking and control system of this invention are possible and all are envisioned to be within the scope of the invention as set forth in the claims.

What is claimed is:

1. A system for tracking movement of objects in a predefined area, said system comprising:
   a central controller;
   a readable tag on each object to be tracked, each readable tag comprising a radio frequency (RF) tag storing a code identifying a corresponding object;
   readers at pre-selected locations within said predefined area for reading the codes of said readable tags as the objects corresponding to said readable tags move past said readers;
   a communications link between said readers and said central controller for communication of codes read by said readers to said central controller;
   said controller being programmed to collect data from said readers for tracking the movement of objects within the predefined area;
   and further comprising at least two RF tags disposed in each object, said central controller being programmed to determine a direction of movement of the object by analyzing data collected by said readers from said at least two RF tags.

2. A system for tracking movement of objects in a predefined area, said system comprising:
   a central controller;
   a readable tag on each object to be tracked, each readable tag storing a code identifying a corresponding object;
   readers at preselected locations within said predefined area for reading the codes of said readable tags as the objects corresponding to said readable tags move past said readers;
   a communications link between said readers and said central controller for communication of codes read by said readers to said central controller;
   said controller being programmed to collect data from said readers for tracking the movement of objects within the predefined area; and
   at least one Key Track system having a Key Track system central controller, said system for tracking movement of objects including connections between said readers and said Key Track central controller for integration of data from said readers with data from said Key Track system.

3. The system for tracking the movement of objects as claimed in claim 2, wherein said Key Track system is configured to detect removal and return of keys providing access to the objects.

4. The system for tracking the movement of objects as claimed in claim 2, further comprising means for generating reports on the movement of objects being tracked based on data from said readers and data from said Key Track system.

5. A method of tracking movement of an object between predetermined zones within an area, said method comprising the steps of:
   (a) establishing transition regions between the predetermined zones;
   (b) detecting the object as the object traverses a transition region;
   (c) identifying the object as the object is detected traversing the transition region in step (b);
   (d) determining a zone in which the object is located based upon the detection and identification of the object in steps (b) and (c);
   step (b) further comprising the steps of providing the object with a readable tag and locating a reader in the transition region for reading the readable tag as the object traverses the transition region;
   and wherein the readable tag in step (b) is and RF tag and the reader includes at least one antenna for receiving RF signals transmitted by the RF tag;
   and wherein step (b) further comprises providing the object with at least two RF tags readable by the reader for determining a direction in which the object traverses the transition zone; and wherein the at least two RF tags are spaced apart on the object to be read in sequence by the reader for determining the direction in which the object traverses the transition region.

6. A method of tracking movement of an object between predetermined zones within an area, said method comprising the steps of:

(a) establishing transition regions between the predetermined zones;

(b) detecting the object as the object traverses a transition region;

(c) identifying the object as the object is detected traversing the transition region in step (b);

(d) determining a zone in which the object is located based upon the detection and identification of the object in steps (b) and (c);

step (b) further comprising the steps of providing the object with a readable tag and locating a reader in the transition region for reading the readable tag as the object traverses the transition region;

and wherein the readable tag in step (b) is and RF tag and the reader includes at least one antenna for receiving RF signals transmitted by the RF tag;

and wherein step (b) further comprises providing the object with at least two RF tags readable by the reader for determining a direction in which the object traverses the transition zone; and wherein the at least two RF tags transmit signals at different radio frequencies for determining the direction in which the object traverses the transition region.

7. A system for tracking and controlling movement of objects in a predefined area comprising:

a central controller;

an array of readers disposed at pre-selected locations in the predefined area, said readers being in communication with said central controller;

a readable tag on each of the objects, each readable tag storing a code identifying a corresponding object;

said codes of said readable tag being detected by said readers as objects move past said readers and being communicated to said central controller;

said central controller being programmed to determine the location of each object by analyzing the codes communicated by said readers;

and wherein the objects are vehicles and the predefined area is the lot of an automobile dealership;

and further comprising a Key Track system located at the automobile dealership, said central controller being a part of the Key Track system and having access to information regarding check out and check in of keys to vehicles at the automobile dealership;

said central controller being programmed to analyze Key Trak information regarding the check out and check in of keys and to integrate the Key Track system information with information communicated by said readers and to reach conclusions regarding authorized movements of vehicles based on said analysis.

8. The system of claim 7 and wherein said central controller uses the integrated information to authorize movement of vehicles.

* * * * *